W. C. McKEAN.
INSTRUCTING DEVICE FOR TEACHING TARGET DESIGNATION.
APPLICATION FILED MAR. 3, 1921.
1,402,940. Patented Jan. 10, 1922.
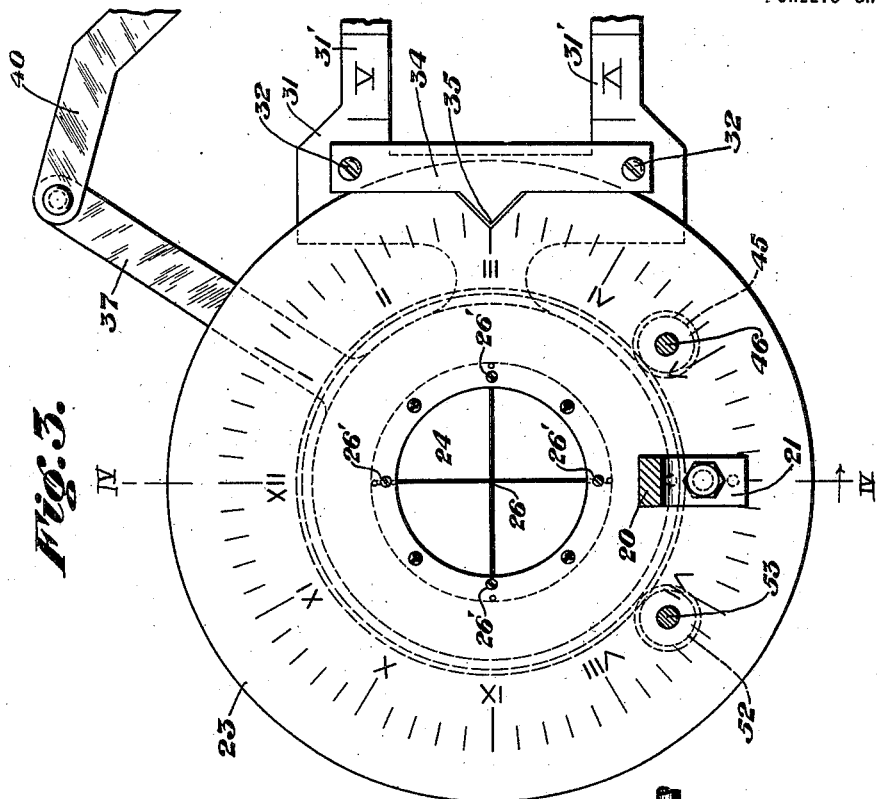
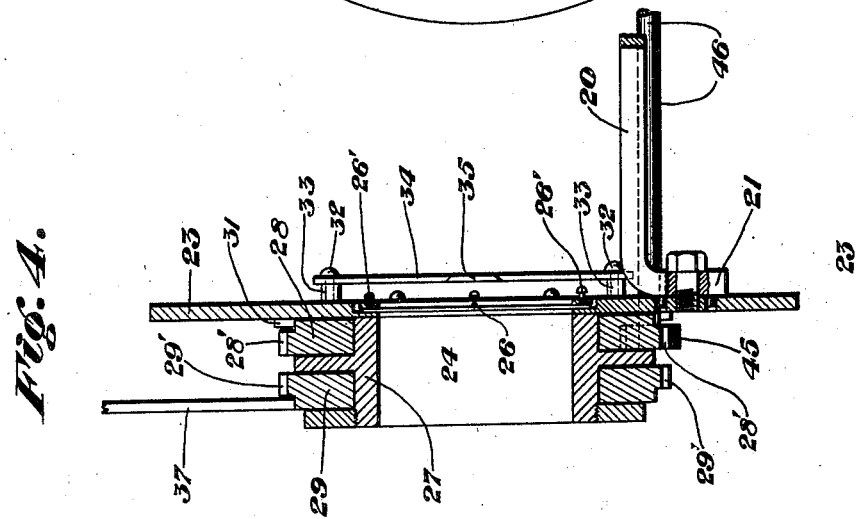
Witnesses:
Inventor:
William C. McKean W. C. McKEAN.
INSTRUCTING DEVICE FOR TEACHING TARGET DESIGNATION.
APPLICATION FILED MAR. 3, 1921.
1,402,940.
Patented Jan. 10, 1922.
4 SHEETS—SHEET 4.
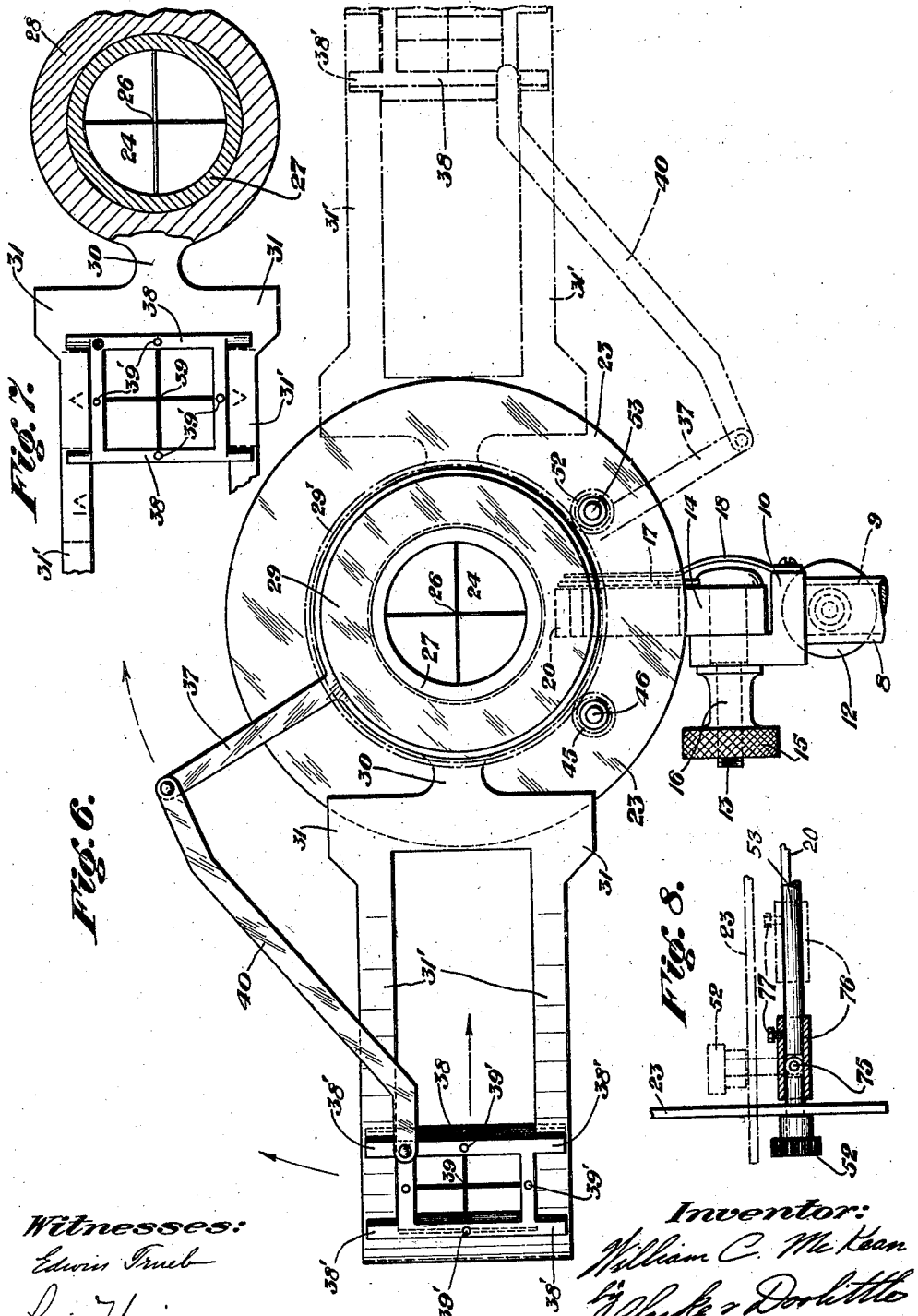

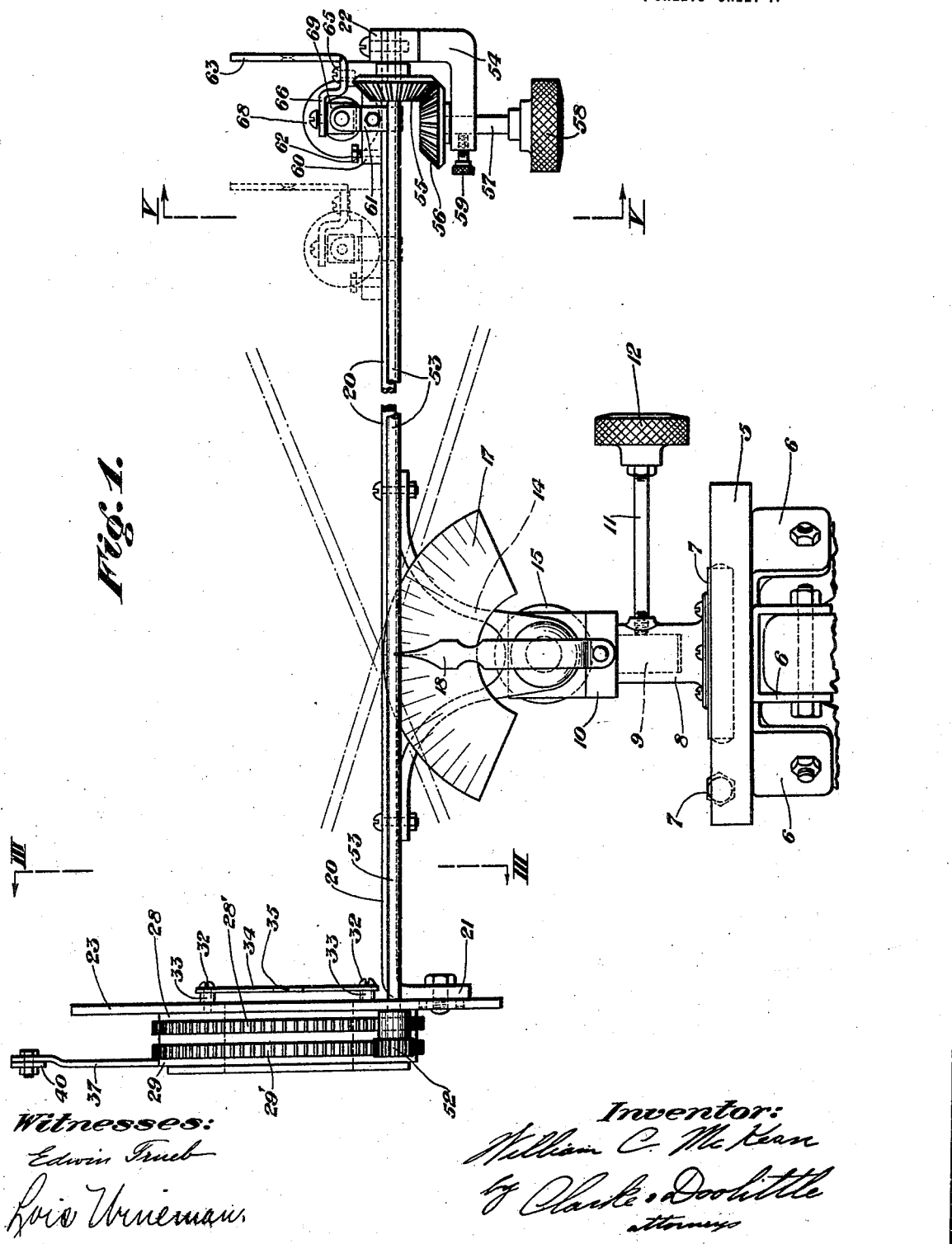

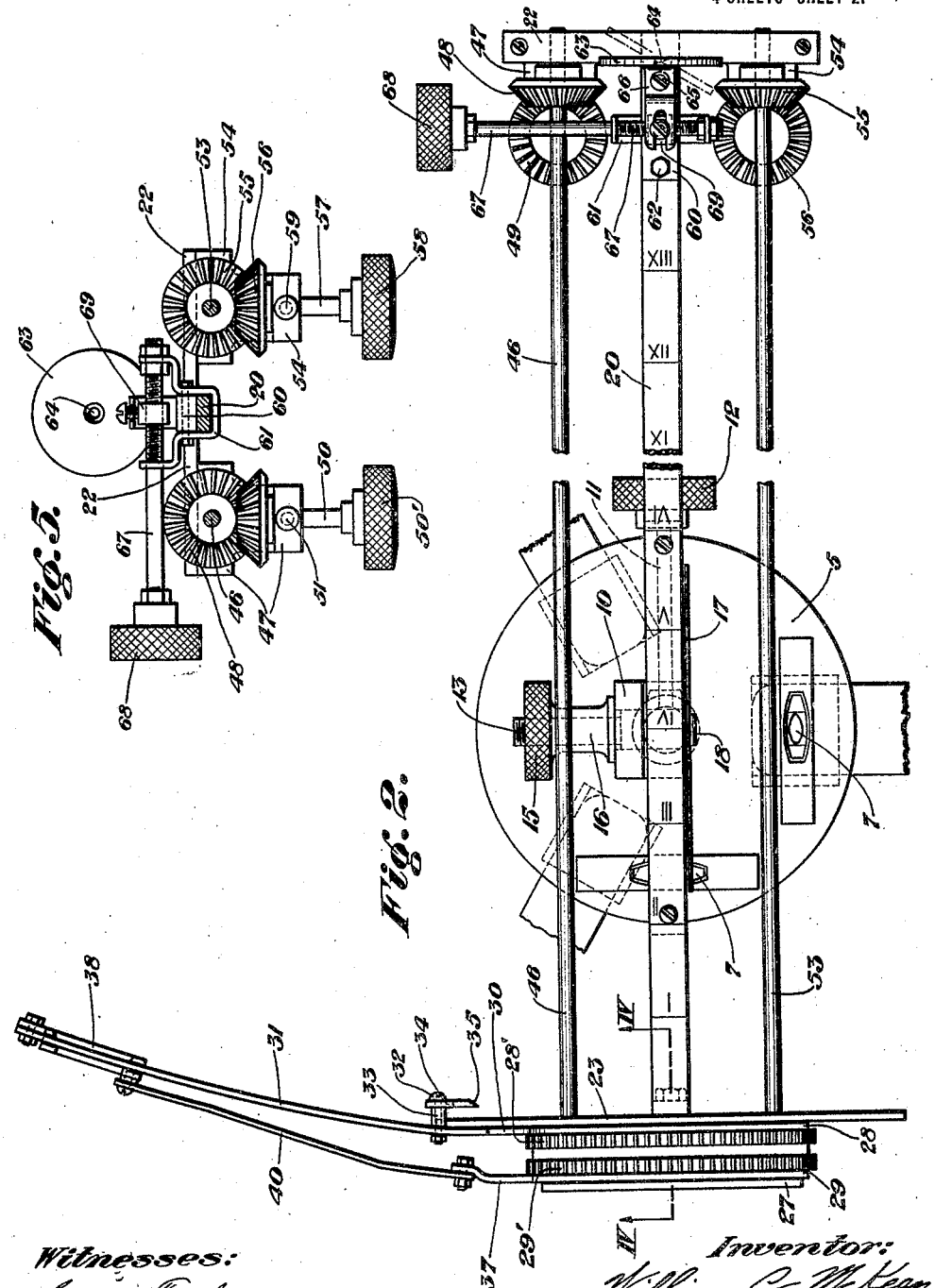

UNITED STATES PATENT OFFICE.

WILLIAM C. McKEAN, OF PITTSBURGH, PENNSYLVANIA, ASSIGNOR OF ONE-FIFTH TO WILLIAM A. GRIFFITH, OF PITTSBURGH, PENNSYLVANIA, ONE-TENTH TO CHARLES M. CLARKE, OF SEWICKLEY, PENNSYLVANIA, AND ONE-TENTH TO WILLIAM G. DOOLITTLE, OF EDGEWORTH, PENNSYLVANIA.

INSTRUCTING DEVICE FOR TEACHING TARGET DESIGNATION.

1,402,940.  Specification of Letters Patent.  Patented Jan. 10, 1922.

Application filed March 3, 1921. Serial No. 449,585.

*To all whom it may concern:*

Be it known that I, WILLIAM C. McKEAN, a citizen of the United States, residing at Pittsburgh, in the county of Allegheny and State of Pennsylvania, have invented certain new and useful Improvements in Instructing Devices for Teaching Target Designation, of which the following is a specification.

This invention is for a device for instructing soldiers or riflemen how to find a target, so that they may quickly learn to locate the position of an inconspicuous or hidden target according to the instructions which are given them, and direct the aim of their rifles accordingly.

According to modern practice, the position and range of a hidden object, such, for instance, as a hidden machine gun nest, is determined. This intelligence is communicated to an officer in the field who is to direct the rifle fire of the men under him at the concealed or inconspicuous object. Difficulty is encountered in instructing the soldier to aim in accordance with this information, especially if he has not had considerable experience.

The usual method has been to direct the soldier's attention to a conspicuous object near the target, and point out the relation of the target thereto. A common method at one time for pointing out this relation was to provide each soldier with a notched stick, and the relation of a target to the conspicuous object was communicated to the soldier, and he could direct the aim of his rifle by using the notches to estimate distances and angles.

The method now more generally in use is to point out a conspicuous object, termed a "reference point," and each man is then instructed to aim his rifle at the object and move it a given number of "sights" horizontally to the right or left, a "sight" being the field of vision obstructed by the sight leaf of the peep sight of the rifle, or, as sometimes roughly gauged, the field of vision obstructed by one finger held fifteen inches from the eye. Then he is instructed to picture a clock face about the object with this number of sights as the radius and the object of reference point as the center. He is then instructed to point his rifle to a given numeral on the clock face, such as two o'clock, depending on the location of the target, to define the radial direction of the target.

If instructions are accurately followed, the sights of the rifle should then be in line with the target, two o'clock being the position of the target. Moving the rifle to the right or left a given number of sights gives the distance of the target from the conspicuous object, moving it to the proper hour on the imaginary clock face gives the elevation or proper inclination for sighting the target. This method is practical, but it is difficult to teach an inexperienced soldier or rifleman to estimate a "sight" and to accurately picture a clock face about the reference point, from which he is to get the position of his target.

The primary object of the present invention is to provide a device for use in instructing soldiers how to gauge a sight and to picture the clock face so that when he is told that his target is in a certain position, such as five sights to the right of a given object, at two o'clock, or three and one-half sights to the left at half-past ten, he can readily estimate where to direct his aim to find the target.

According to my invention, I provide an apparatus for field use having means for taking a sight on the reference point, and which, when sighted on the reference point, may be fixed, while a second movable means is provided which can be adjusted a certain number of sights to the right or left and then swung in an arc to a given angle to the horizontal according to a graduated dial or gauge calibrated to correspond to the face of a clock, so that when the adjustable means has been set at the given number of sights and swung to the proper angle, as indicated by the dial, the movable member will be sighted on the target. After using the apparatus, the soldier will readily learn how to estimate at what distances to move his rifle to find the target.

My invention may be readily understood by reference to the accompanying drawings, in which:—

Fig. 1 is a side elevation of a device embodying my invention;

Fig. 2 is a top plan view thereof;

Fig. 3 is a section on a larger scale on line III—III of Fig. 1, and showing a portion of the device broken away;

Fig. 4 is a vertical transverse section on line IV—IV of Fig. 3;

Fig. 5 shows a section on line V—V of Fig. 1;

Fig. 6 is a front view of the device;

Fig. 7 is a detail showing a portion of the adjustable arm on which the movable sight is carried; and Fig. 8 is a detail view showing a modified construction capable of being folded to require less space.

In the drawings, 5 indicates a supporting plate or base having depending ears 6 thereon for connection with legs of a suitable stand or tripod. In the top of the plate 5 are levels 7 disposed at right angles to each other. Secured to the center of the plate 5 is a pedestal 8 having a socket formed therein. A pintle 9 having an angle shaped head 10 projects into the recess in the pedestal. A set screw 11 having a knob 12 is provided for locking the pintle from rotation. Passing through the upright portion of the angle shaped head 10 is a bolt 13 journalled therein, and which has its head secured to a supporting member 14. At 15 is a knurled thumb nut having portion 16 for frictionally clamping the supporting member against rocking. The supporting member has a protractor 17 secured thereto, and a pointer 18 secured to head 10 serves to indicate the angle of slope at which the supporting member is set.

Secured to the top of the supporting member 14 is a longitudinal strip 20 forming the frame or body member of my invention. This strip is preferably about fifteen inches long and has a depending portion 21 at the front end thereof and a cross strip 22 at its rear end. The top of the strip is preferably calibrated, the calibrations shown in Fig. 2 representing inches.

Fastened to the angular depending portion 21 is a disk 23 having a central opening 24 therein, across which are suitably arranged cross wires 26. The ends of the cross wires are preferably held in position by set screws 26′ in the disk, and are so arranged that they may be readily renewed. The rear face of the disk 23 is provided with a graduated dial representing a clock face, see Fig. 3. Extending forwardly from the front of the disk is a sleeve 27, see Fig. 4, on which are arranged two annular rotatable members 28 and 29 which are spaced from each other. Member 28 has an annular portion of its periphery provided with gear teeth 28′ and teeth 29′ are similarly arranged on member 29.

As shown in Figs. 2 and 7, member 28 has a radially extending arm 30 which carries a rectangular frame 31 having a rectangular opening therein and having its side members 31′ divided into equal parts which are numbered, the scale of divisions being on the rear face of the frame. Carried at the inner end of the rectangular frame by bolts 32 having separators 33 thereon is a bridge 34 which projects over the dial on disk 23, a pointer 35 being provided at the center of the bridge. The pointer is in alinement with the radius about which the rectangular frame 31 revolves when member 28 is rotated and in juxtaposition to the dial.

The annular rotating member 29 carries a radially projecting arm 37. Slidably supported in the rectangular frame 31 is a slide or sight 38 having cross wires 39 therein, the width of the opening in the slide corresponding to the distance between the calibrations on the frame members 31′. The ends of the cross wires pass through the sides of the sight and are held in position by set screws 39′ in such manner that they may be readily renewed. The ends 38′ of the slide frame serve as indicators for showing the position of the slide with relation to the scale on members 31′. A link 40 of the shape shown, pivotally connected to arm 37 and slide 38, as shown clearly in Fig. 6, serves to move the slide or sight 38 in the rectangular frame when the member 29 is rotated.

For rotating the annular member 28 to move the rectangular frame 31 through an arc of a circle, a pinion 45 meshing with gears 28′ is provided on a longitudinally extending shaft 46 journalled in the disk 23 and in an angle-shaped block 47 depending from cross strip 22. Shaft 46 has secured thereto at a point adjacent the cross strip a bevel wheel 48. A bevel gear 49 on a vertical shaft 50 journalled in the horizontal portion of angle-shaped block 47 meshes with gear 48. A knob 50′ on shaft 50 serves as a means for rotating bevel wheel 49, gear 48, shaft 46, and pinion 45. A set screw 51 serves to hold shaft 50 from rotation when it is desired to lock the parts in position.

A similar means, comprising pinion 52, shaft 53, angle block 54, miter gears 55 and 56, shaft 57, and knob 58 serve to rotate annular member 29. A set screw for shaft 57 is provided at 59.

A block 60 resting on the strip 20 and slidably positioned thereon by means of a strip 61 passing under the strip and secured to the sides of the block 60 is provided. (See Fig. 5.) A set screw 62 serves to lock the member in position. Carried on the block is a "peep-sight" in the form of a disk 63 having a small central opening 64 therein. The disk is pivotally supported on the block by means of a screw 65 passing through a horizontal strip 66 formed integrally with the disk. The free end of strip 66 is bifurcated, as shown in Fig. 2. Supported in the ends of strip 61 is a screw shaft 67 having a knob 68 for turning it and a nut 69 having a projection engaging in the bifurcated end of strip 66. By turning screw 67, the nut 69 travels therealong, swinging strip 66 to turn disk 63. Thus, a sliding and swinging peep-sight is provided, although it is not necessary that the peep-sight should be so arranged.

The device is intended primarily for instruction purposes, and not for use in actual battle, the soldiers applying in battle the knowledge which they have gained by using the instrument. In use, the device is taken into the field with inexperienced soldiers under the direction of an officer, or other person familiar with the use of the instrument. It is light and relatively small, and can be readily carried about. In the field, it is set up on a tripod in such manner that the base is level, as indicated by the spirit levels 7. By means of indicator 18 and protractor 17, the slope of the land may be determined. The officer selects a target and a conspicuous object as a reference point, which, for the purpose of illustration, may be a clump of bushes on a wooded hill several hundred or thousand yards distant, and a large dead tree on the same hill, respectively. Obviously, to an untrained soldier, it would be difficult to describe which particular clump of bushes on the wooded hill is the target.

Having chosen the reference point and the target, the instrument is sighted so that the reference point, the dead tree, and the cross wires 26 are in line when viewed through the peep-sight 64. When this has been done, set screw 11 and lock nut 15 are tightened to keep this alinement. Inasmuch as the normal distance between the eye of a soldier and the peep-sight on his rifle is between thirteen and three quarters and fifteen inches, the peep-sight is clamped by means of screw 62 at a position in which it is at a point about fifteen inches from cross wires 26, according to the scale on the strip 20. Because fifteen inches is the normal distance from the eye of the soldier to the rear sight or sight leaf of the regulation rifle, the peep-sight need rarely be adjusted longitudinally in using the instrument.

The instrument having been thus sighted on the reference point, the officer estimates the distance from the object to the target and its elevation with relation thereto, the distance being estimated in "sights," a "sight" as previously stated being the width of the field of vision obstructed by the sight leaf of a rifle when raised in a vertical position with the eye about fifteen inches therefrom. The elevation is estimated by imagining the target to be on the dial of a clock face whose center is the reference point, the distance between the reference point and the target being the radius. Assuming that the distance from the reference point, or tree, to the target, the clump of bushes, is eight sights, and the elevation is two o'clock, the knob 50' is turned until pointer 35 points to two o'clock, and screw 51 is tightened to hold the rectangular frame 31 and the pointer 35 at this position. Two o'clock actually being one-third of the distance between three o'clock, the horizontal position, and twelve o'clock, the vertical position, the rectangular frame slopes at an angle of 30° to the horizontal. Knob 58 is then turned until the sight 38 is moved to position VIII on the members 31' of the rectagular frame. The calibrations on the members 31' correspond to the actual distance or arc through which the sight of the rifle swings when moved to cover a horizontal distance of one sight. Thus, when the sliding sight 38 is at position VIII, its cross wires are eight sights from the cross wires 26. Now, if the target is eight sights from the object and at two o'clock, it will be in line with the cross wires 39 of sight 38 when viewed through peep-sight 64. In order that the cross wires 39 may be visible through peep-sight 64, the disk 63 may be turned as indicated in dotted lines in Fig. 2 by turning knob 68, causing nut 69 to move transversely, transmitting motion to the end of pivoted member 66.

Having sighted the target in sight 38, screw 59 is tightened, and the soldiers to be instructed can see their target and at the same time see its relation to the reference point, and can learn to estimate how their rifle must be moved to cover a sight or a distance of eight sights, in the illustration given. After sufficient practice with the instrument, the soldiers or riflemen will quickly learn to estimate distances and readily imagine the clock face about the reference point, so that in battle, when they are told that a concealed target is a given number of sights to the right or left, at an elevation of a given hour, they can aim their rifles at the target accurately and quickly. From the foregoing, it will be obvious that the device greatly facilitates the instruction of an inexperienced recruit.

In the drawings, it will be noted that the first position or calibration on the members 31' of the rectangular frame 30 is V. This is because the distance from cross wires 26 to cross wires 39 when in the position nearest the center covers five sights, and with the apparatus shown, distances of less than five sights are estimated by an imaginary division of the distance from the center to the cross wires of slide 38 at position V into fourths, using the scale on frame members 31' as means for estimating the proper division. By curving the rectangular frame 31, as shown, with the center of curvature at substantially the normal distance of the peep-sight, the distance of sight 39 from the peep-sight remains substantially constant as the slidable sight 38 moves away from the disk.

By reference to the dotted line position of Fig. 6, it will be seen that the slide can be readily adjusted with the knob 58 irrespective of the position of the rectangular frame 31, a unique arrangement for moving the sight 38 radially and concentrically with relation to sight 26 thus being provided.

The device may be adapted for use with different types of rifles by having the peep-sight longitudinally adjustable, differences in the field of sight and in the distance from the eye of the operator being compensated for by this adjustment of the peep-sight.

In the modification shown in Fig. 8, which is diagrammatic, the disk is indicated at 23 and the longitudinal frame member is at 20, as in the previous construction, and one of the operating rods is indicated at 53. In this construction, however, it is contemplated that the disk fold over to the horizontal position indicated in dotted lines in order that the instrument may be more readily transported and packed. To this end, a hinge or pivoted joint 75 is provided in each of the two operating shafts and in strip 20, the centers of the hinges all being in line. To give rigidity to the disk when in vertical position, sleeves such as that shown at 76 are provided, which are slidable on the various parts, these sleeves being over the hinges when the disk is vertical and moved to the dotted line position when the disk is horizontal. Set screws 77 may be provided for holding sleeves in position.

While I have described a preferred form of my invention, it will be obvious that various changes and modifications may be made therein within the scope of the appended claims.

What I claim is:

1. An instruction device of the kind described comprising a peep-sight and a pair of other sights disposed in front of the peep-sight, one of said sights being fixed and the other movable toward or away from the fixed sight and at different angles relatively thereto, either of which movements may be effected independently.

2. An instruction device of the kind described comprising a peep-sight, a second sight disposed in front of the peep-sight, and another sight movable concentrically and radially about the said second sight.

3. An instruction device of the kind described comprising a peep-sight, a second sight disposed in front of the peep-sight, and another sight movable concentrically and radially with relation to the second sight, and means whereby the movable sight will at all times be substantially the same distance from the peep-sight as said second sight.

4. An instruction device of the kind described for use in teaching rifle aiming, comprising a peep-sight, a second sight disposed in front of the peep-sight at a distance corresponding to the distance between the sight of the rifle and the normal position of the eye of a person firing the same, and another sight movable radially and concentrically with relation to said second sight.

5. An instruction device of the kind described comprising a peep-sight, a second sight disposed in front of the peep-sight, means whereby the distance between the second sight and peep-sight may be varied, and another sight movable concentrically and radially with relation to the second sight.

6. An instruction device of the kind described comprising a peep-sight, a second sight disposed in front of the peep-sight, means whereby the peep-sight may be moved toward or away from the second sight, and another sight movable concentrically and radially with relation to the second sight.

7. An instruction device comprising two sights, means whereby one of said sights may be moved radially and concentrically with relation to the other, a peep-sight behind the said two sights, and means whereby the peep-sight may be turned for looking through either of said two sights.

8. An instruction device of the kind described comprising a dial having a centrally positioned sight therein, a second sight movable concentrically and radially with relation to the first named sight, an indicator in juxtaposition to the dial for indicating the angular position of said second sight with relation to the first, and a peep-sight spaced from said first and second sights.

9. An instruction device of the kind described comprising a graduated dial, the calibrations of which correspond to a clock face, having a centrally positioned sight therein, a second sight movable concentrically and radially with relation to the first named sight, an indicator in juxtaposition to the dial for indicating the angular position of said second sight with relation to the first, and a peep-sight spaced from said first and second sights.

10. An instruction device of the kind described comprising a dial having a centrally positioned sight therein, a second sight movable concentrically and radially with relation to the first sight, an indicator in juxtaposition to the dial for indicating the angular position of said second sight with relation to the first, means for indicating the distance of the second sight from the first, and a peep-sight spaced from the first and second sights so that different objects may be sighted through the peep-sight and first and second sights to determine the relation of the objects with each other.

11. An instruction device of the kind described comprising a longitudinal body member, a peep-sight near one end of the body member, a disk at the other end of the body having a centrally located sight therein, a pair of annular rotatable members around said central sight, a frame member carried by one of said annular rotatable members, a slidable sight on the frame member, means connecting the other annular rotatable member with the slide to move the slidable sight along said frame, and means for rotating the annular members.

12. An instruction device of the kind described comprising a longitudinal body member, a peep-sight near the rear end of the body member, a disk at the front end of the body member having a centrally positioned sight therein, a pair of annular rotatable members around said central sight, gear teeth on said annular members, a frame member on one of said annular members, a slidable sight on said frame, means connecting the slidable sight with the other rotatable member for moving it along said frame by rotation of the annular member with which the slide is connected, a pinion engaging the gear teeth on one of said annular members to rotate it, a longitudinally extending shaft on which the pinion is carried, which shaft is journalled at the rear of said longitudinal body member, means for rotating the shaft, a second pinion for engaging the gear teeth on the other of said annular members, a longitudinally extending shaft on which the pinion is carried, said shaft also being journalled at the rear of said longitudinal member, and means for rotating the shaft.

13. An instruction device of the kind described comprising a longitudinal body member, a peep-sight near one end of the body member, a disk at the other end of the body having a centrally located sight therein, a pair of annular rotatable members around said central sight, a frame member carried by one of said annular rotatable members, a slidable sight on the frame member, means connecting the other annular rotatable member with the slide to move the slidable sight along said frame, and means located near the peep-sight for rotating the annular members.

14. An instruction device of the kind described comprising a longitudinal body member, a peep-sight near one end of the body member, a disk at the other end of the body having a centrally located sight therein, a pair of annular rotatable members around said central sight, a frame member carried by one of said annular rotatable members, a slidable sight on the frame member, means connecting the other annular rotatable member with the slide to move the slidable sight along said frame, and gearing for rotating each of the annular members independently of the other.

15. An instruction device of the kind described comprising a longitudinal body member, a peep-sight near one end of the body member, a disk at the other end of the body having a centrally located sight therein, a pair of annular rotatable members around said central sight, a frame member carried by one of said annular rotatable members, a slidable sight on the frame member, means connecting the other annular rotatable member with the slide to move the slidable sight along said frame, means for rotating each of the annular members, and means for locking them against rotation.

16. As instruction device of the kind described comprising a base, a body member rotatably pivoted on said base, means whereby the body member may be rocked vertically, means for indicating the angle at which the body member is rocked, a peep-sight at one end of the body member, a second sight disposed at the other end of the body member in front of the peep-sight, and another sight movable concentrically and radially with relation to the first sight.

In testimony whereof I affix my signature in presence of two witnesses.

WILLIAM C. McKEAN.

Witnesses:
Lois Wineman,
Wm. H. Parmelee.